March 6, 1928.

A. J. BODKER 1,661,593

ROTARY INTERNAL COMBUSTION ENGINE

Filed May 19, 1926    4 Sheets-Sheet 1

Inventor
A. J. Bodker.
By Lacey & Lacey, Attorneys

March 6, 1928.

A. J. BODKER 1,661,593

ROTARY INTERNAL COMBUSTION ENGINE

Filed May 19, 1926  4 Sheets-Sheet 2

Inventor
A. J. Bodker.
By Lacey & Lacey, Attorneys

March 6, 1928.  1,661,593

A. J. BODKER

ROTARY INTERNAL COMBUSTION ENGINE

Filed May 19, 1926   4 Sheets-Sheet 3

Inventor

A. J. Bodker.

By Lacey & Lacey, Attorneys

March 6, 1928.
A. J. BODKER
1,661,593
ROTARY INTERNAL COMBUSTION ENGINE
Filed May 19, 1926   4 Sheets-Sheet 4
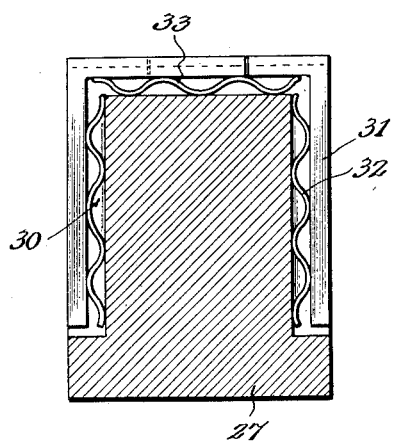
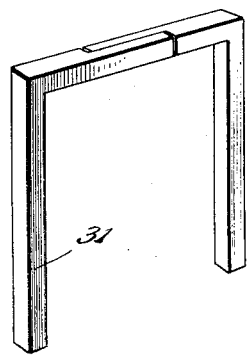
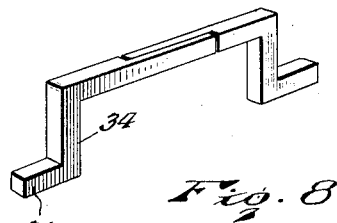
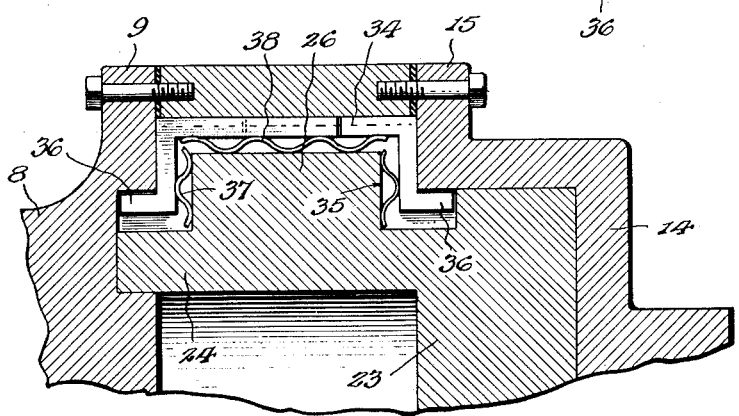
Inventor
A. J. Bodker.
By Lacey & Lacey, Attorneys Patented Mar. 6, 1928.

1,661,593

UNITED STATES PATENT OFFICE.

ALBERT J. BODKER, OF PONCHATOULA, LOUISIANA.

ROTARY INTERNAL-COMBUSTION ENGINE.

Application filed May 19, 1926. Serial No. 110,229.

This invention relates to an improved rotary internal combustion engine and seeks, among other objects, to provide an engine of this character which, with a minimum of parts, will deliver practically a continuous flow of power.

The invention seeks, as a further object, to provide an engine eliminating the use of valves, crank shaft, and connecting rods, and will, accordingly, eliminate the troubles and disadvantages incident the service of such parts.

Another object of the invention is to provide an engine embodying separate compression and firing chambers, the fuel mixture being drawn into the compression chamber and compressed and then transferred to the firing chamber and ignited for driving the engine, and wherein tandem rotors will be employed on the power shaft of the engine to turn in said chambers so that the power realized on the driving rotor will be directly utilized, in part, for turning the compressing rotor.

And the invention seeks, as a still further object, to provide an engine wherein improved packing means will be provided in connection with the rotors and the pistons.

Other objects of the invention not specifically mentioned in the foregoing will appear during the course of the following description.

In the accompanying drawings:

Figure 5 is a detail sectional view on line 5—5 of Figure 4.

Figure 6 is a detail perspective view of one of the piston packing members.

Figure 7 is an enlarged sectional view on line 7—7 of Figure 4.

Figure 8 is a detail perspective view of one of the rotor packing members.

Figure 1:
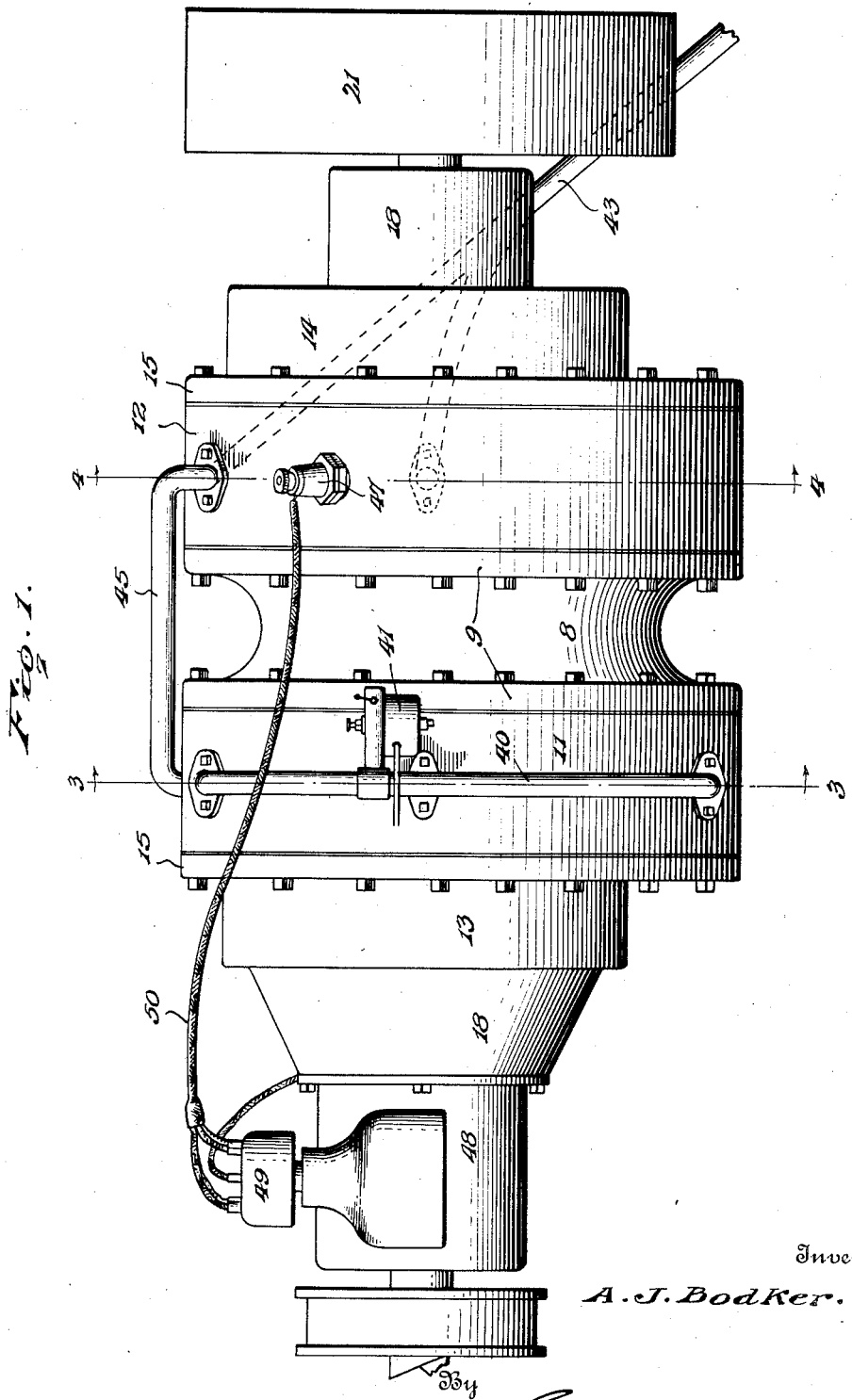
Figure 1 is a side elevation of my improved engine.
Figure 2:
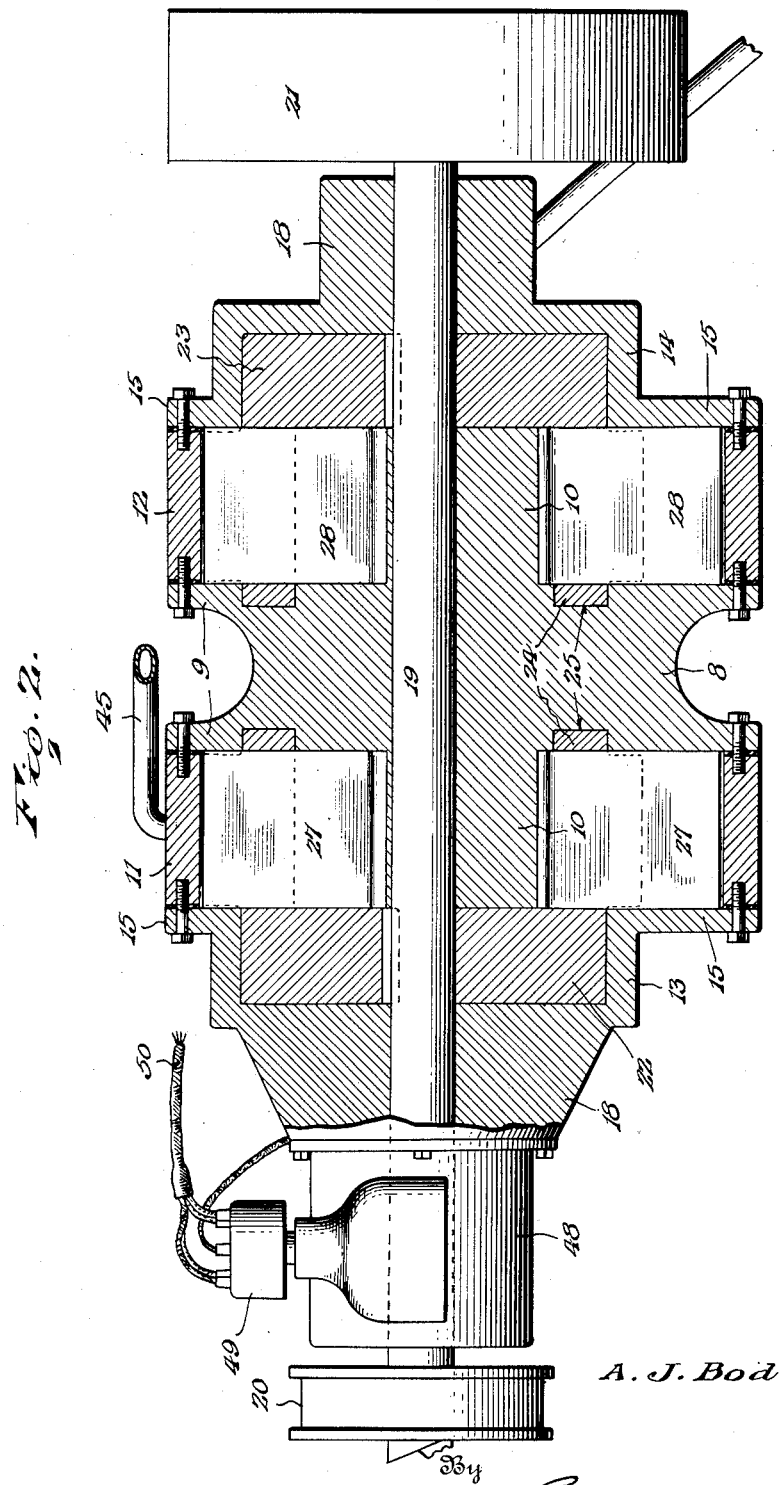
Figure 2 is a view partly in longitudinal vertical section and partly in elevation, this view particularly showing the chambers of the engine casing as well as the rotors.
Figure 4:
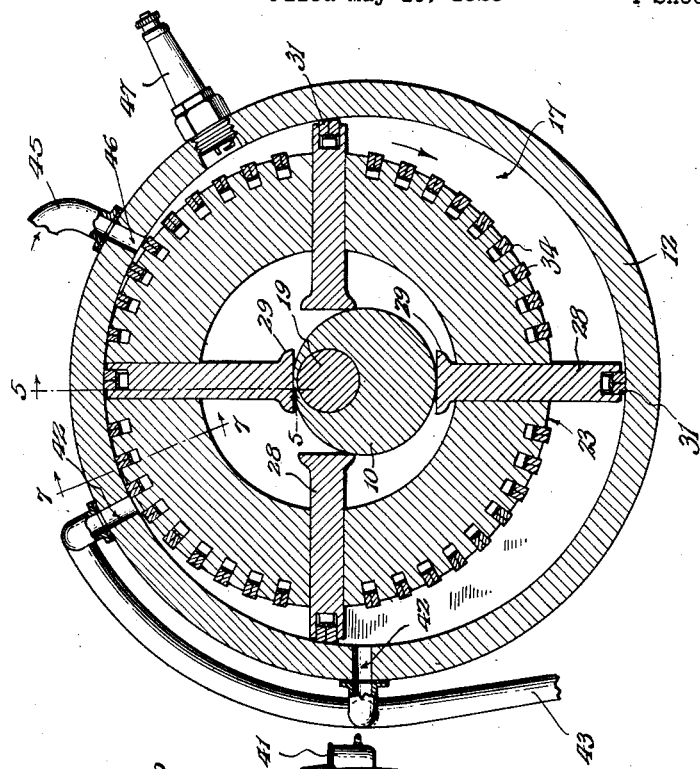
Figure 4 is a transverse sectional view on the line 4—4 of Figure 1, looking in the direction indicated by the arrows.
Figure 3:
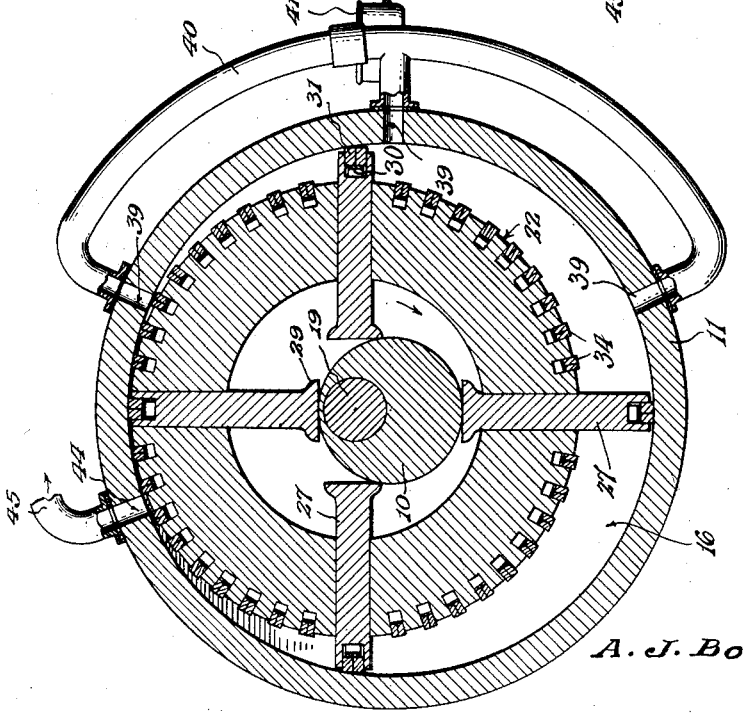
Figure 3 is a transverse sectional view on the line 3—3 of Figure 1, looking in the direction indicated by the arrows.

In carrying the invention into effect, I employ a stator casing which embodies a cylindrical center block or plate 8 having radial flanges 9, and formed on the plate at opposite sides thereof are axially alined cylindrical hubs 10 disposed concentrically of said plate. Bolted to the plate at one side thereof is a casing ring 11 while a like casing ring 12 is similarly secured to the plate at its opposite side, and fixed to the rings are front and rear end caps 13 and 14 having radial flanges 15 bolted to said rings. As best seen in Figure 3, a compression chamber 16 is thus defined at the front of the casing while a like firing chamber 17 is defined at the rear of the casing. The caps 13 and 14 are disposed eccentrically with respect to the plate 8, being provided with alined bearings 18, and journaled through said bearings and through the center plate 8 and hubs 10 is an eccentrically located power shaft 19, to the forward end of which may be fixed a fan belt pulley 20 while the shaft preferably carries a flywheel 21 at its rear end.

Fixed to the forward end portion of the shaft 19 is a compressing rotor 22 rotatably fitting in the end cap 13, and fixed to the rear end portion of said shaft is a like driving rotor 23 rotatably fitting in the end cap 14. These rotors are provided with annular flanges 24 which extend across the chambers 16 and 17 in concentric relation to said shaft, and formed in the side faces of the center plate 10 to rotatably receive the free margins of said flanges are annular grooves 25. Thus, as will be perceived, the rotors are located eccentrically of the chambers 16 and 17, and formed on the rotor flanges 24 to nearly touch the casing rings 11 and 12 at the upper side of the casing, as best seen in Figure 7, are external annular reinforcing ribs 26 which are rectangular in cross section to rotatably fit within said chambers.

Slidably fitting through the flanges 24 of the rotors at the ribs 26 are the engine pistons, the quadrantly spaced pistons of the rotor 22 being indicated at 27 and the similarly spaced pistons of the rotor 23 being indicated at 28. These pistons are disposed radially of the shaft 19, and formed on the pistons at their inner ends are lateral flanges 29 to coact with the hubs 10 of the center plate 8. Formed in the side edges of the pistons as well as in the outer end edges thereof, as seen in Figure 3, are grooves 30, and slidably fitting in said grooves are inverted U-shaped packing members 31 which, as seen in Figure 6, are each formed of companion inverted L- shaped sections, the short legs of which are provided with a lap joint. Disposed within the grooves behind the long legs of the sections are corrugated springs 32, and disposed behind short legs of the sections are similar shorter springs 33. The springs 32 will thus press the sections laterally to coact with the flanges 9 of the plate 8 and the flanges 15 of the end caps 13 and 14, while the springs 33 will press the sections radially outward to coact with the casing rings 11 and 12. Thus, the springs 33 will afford expansion and contraction in the effective length of the pistons and will serve to yieldably hold the pistons in engagement with the hubs 10 of the plate 8. As will be perceived, the pistons divide the chambers 16 and 17 into a plurality of pockets and are confined between the rings 11 and 12 and the hubs 10 to revolve about said hubs, so that as the rotors turn, said rotors will, being eccentrically mounted relative to said hubs, rise and fall with respect to the pistons for varying the area of said pockets.

Mounted upon each of the flanges 24 of the rotors between the pistons carried thereby is a plurality of more or less closely spaced substantially U-shaped packing members 34, which in effect, straddle the ribs 26 of said flanges. As seen in Figure 7, the ribs and said flanges are provided with grooves 35 to slidably accommodate said members, each of which, as brought out in Figure 8, is formed of companion substantially Z-shaped sections having long lateral ends provided with a lap joint while the short ends of said sections form terminal lugs 36. Corresponding lugs of the packing members project into the grooves 25 of the center plate 8 while opposite corresponding lugs of said members project within the end caps 13 and 14, and disposed behind the members within the grooves 35 are corrugated springs 37 pressing the sections of the members laterally to coact with the flanges 9 of the center plate 8 and with the flanges 15 of the end caps 13 and 14. Longer corrugated springs 38 serve to press the members outwardly to successively coact with the casing rings 11 and 12 as the rotors revolve and, as will be perceived, the lugs 36 of said members will coact with the outer peripheral walls of the grooves 25 and with the cylindrical walls of the end caps 13 and 14 for limiting the members against outward displacement.

As shown in Figure 3, the compression chamber 16 is provided preferably with three circumferentially spaced intake ports 39, and communicatiing with said ports is an intake manifold 40 with which is connected a suitable carbureter 41. The firing chamber 17 is provided preferably with a pair of spaced exhaust ports 42, and communicating with said ports is an exhaust manifold 43. The chamber 16 is further provided with a transfer port 44 connected by a transfer pipe 45 with a transfer port 46 in the chamber 17, and mounted upon the casing ring 12 near the adjacent end of said pipe is a suitable spark plug 47.

Bolted to the forward end of the end cap 13 is a generator housing 48 enclosing a suitable generator driven by the shaft 19, the generator not being shown. The housing 48 carries a suitable distributer indicated as a whole at 49, and the four output terminals of the distributer are connected with the spark plug 47 by an appropriate cable 50 so that, as each of the pistons 28 reaches a given position beyond the spark plug 47, a circuit will be closed through the plug for firing a fuel charge behind the piston.

The shaft 19 turns in a clockwise direction so that, as will now be seen, as the pistons 27 are caused to travel downwardly by the rotor 22, said pistons will draw in fuel mixture through the intake ports 39 while, as the pistons are caused to travel upwardly, the fuel mixture will be impelled by the pistons toward the transfer port 44. Since pockets between the pistons are gradually enlarged with the downward movement of the pistons, due to the eccentric disposition of the rotor 22, the three intake ports are located to adequately supply said pockets with the fuel mixture. However, with the upward movement of the pistons, the pockets are gradually contracted, with the result that as each pocket is brought into communication with the transfer port 44, the fuel charge in said pocket is highly compressed, being finally forced through said port and through the pipe 45 to enter, at the port 46, a correspondingly contracted pocket between a pair of the pistons 28 in the chamber 17. The compressed charge in the latter pocket is, after the piston behind the charge has passed the port 46, then fired at the spark plug to act against the piston at the time below the spark plug for driving the rotor 23. The rotor 23 will thus receive a power impulse every quarter turn for driving the shaft 19 and turning the rotor 22. As the pistons 28 travel upwardly in the chamber 17, the burnt gases will be forced out in front of the pistons through the exhaust ports 42 and exhaust manifold 43 so that, as will be perceived, the chamber 17 will be effectually scavenged.

Having thus described the invention, what I claim is:

1. In a rotary internal combustion engine, a casing, including eccentrically located end caps and a center plate dividing the casing into compression and firing chambers, fuel charge conducting means connecting said chambers, a power shaft journaled in said end caps eccentrically of said chambers, the center plate being formed with grooves, rotors fitting in said end caps and fixed to said shaft to extend across said chambers and rotatably fitting in said grooves, spring pressed packing members carried by the rotor to coact with the casing and provided with lugs engaging in said end caps and in said grooves for limiting the packing members against displacement from the rotors, and pistons carried by the rotors to coact with the casing.

2. In a rotary internal combustion engine, a center plate having radial flanges and provided axially with concentric cylindrical hubs projecting from the side faces of the plate, the side faces of the plate being formed with eccentrically disposed grooves, casing rings fixed to said flanges, cylindrical end caps having radial flanges fixed to said rings, said end caps being located eccentrically with respect to the axes of said hubs and defining compression and firing chambers, fuel charge conducting means connecting said chambers, a power shaft journaled in said end caps and extending through said center plate eccentrically of said chambers, rotors fitting in said end caps and fixed to said shaft to extend across said chambers eccentrically thereof and rotatably fit in said grooves, spring pressed packing members carried by the rotors to coact with said casing rings and with the flanges of said center plate and end caps and provided with lugs extending within the end caps as well as within said grooves for limiting said members against displacement from the rotors, pistons slidably received through the rotors to rest at their inner ends against said hubs, and spring pressed packing members carried by the pistons to coact with the flanges of said end caps and the center plate as well as with said casing rings.

In testimony whereof I affix my signature.

ALBERT J. BODKER. [L. S.]